United States Patent
Liu et al.

(10) Patent No.: US 12,250,696 B2
(45) Date of Patent: Mar. 11, 2025

(54) METHOD AND APPARATUS FOR WIRELESS COMMUNICATION

(71) Applicant: Lenovo (Beijing) Ltd., Beijing (CN)

(72) Inventors: Hongmei Liu, Changping District (CN); Zhi Yan, Xicheng District (CN); Yuantao Zhang, Dongcheng District (CN); Yingying Li, Haidian District (CN); Haiming Wang, Xicheng District (CN)

(73) Assignee: Lenovo (Beijing) Limited, Beijing (CN)

( * ) Notice: Subject to any disclaimer, the term of this patent is extended or adjusted under 35 U.S.C. 154(b) by 379 days.

(21) Appl. No.: 17/793,121

(22) PCT Filed: Feb. 27, 2020

(86) PCT No.: PCT/CN2020/077030
§ 371 (c)(1),
(2) Date: Jul. 15, 2022

(87) PCT Pub. No.: WO2021/168752
PCT Pub. Date: Sep. 2, 2021

(65) Prior Publication Data
US 2023/0064881 A1 Mar. 2, 2023

(51) Int. Cl.
*H04W 72/23* (2023.01)
*H04L 5/00* (2006.01)
(Continued)

(52) U.S. Cl.
CPC ........... *H04W 72/23* (2023.01); *H04L 5/0051* (2013.01); *H04L 27/26025* (2021.01); *H04W 72/044* (2013.01)

(58) Field of Classification Search
CPC . H04W 72/232; H04W 72/0446; H04W 8/22; H04W 72/23; H04W 72/044; H04L 1/0003; H04L 5/0051; H04L 27/26025
See application file for complete search history.

(56) References Cited

U.S. PATENT DOCUMENTS

| 2014/0044040 A1 | 2/2014 | Chen et al. |
| 2017/0250781 A1 | 8/2017 | Golitschek Edler Von Elbwart et al. |

(Continued)

FOREIGN PATENT DOCUMENTS

| CN | 109831932 A | 5/2019 |
| CN | 110771197 A | 2/2020 |

(Continued)

OTHER PUBLICATIONS

PCT/CN2020/077030 , "International Preliminary Report on Patentability", PCT Application No. PCT/CN2020/077030, Sep. 9, 2022, 5 pages.

(Continued)

*Primary Examiner* — Iqbal Zaidi
(74) *Attorney, Agent, or Firm* — FIG. 1 Patents

(57) ABSTRACT

Embodiments of the present disclosure relates to methods and apparatuses for wireless communication. According to some embodiments of the present disclosure, a method includes: receiving a signaling indicating configuration information on a set of aperiodic channel state information reference signal (CSI-RS) resources corresponding to a trigger state in a downlink control information (DCI). The set of aperiodic CSI-RS resources may include a plurality of subsets of aperiodic CSI-RS resources; and receiving at least one aperiodic CSI-RS resource of the set of aperiodic CSI-RS resources according to the configuration information.

20 Claims, 8 Drawing Sheets

(51) Int. Cl.
*H04L 27/26* (2006.01)
*H04W 72/044* (2023.01)

(56) References Cited

U.S. PATENT DOCUMENTS

| | | | |
|---|---|---|---|
| 2019/0149365 A1* | 5/2019 | Chatterjee | H04L 25/0226 370/329 |
| 2019/0150183 A1* | 5/2019 | Aiba | H04W 24/10 370/336 |
| 2021/0266944 A1* | 8/2021 | Noh | H04W 72/0453 |
| 2021/0298038 A1* | 9/2021 | Kang | H04L 5/0057 |

FOREIGN PATENT DOCUMENTS

| | | | |
|---|---|---|---|
| WO | 2017128175 A1 | 8/2017 | |
| WO | 2018060971 A1 | 4/2018 | |
| WO | 2019137811 A1 | 7/2019 | |
| WO | 2020036362 A1 | 2/2020 | |

OTHER PUBLICATIONS

PCT/CN2020/077030, "International Search Report and Written Opinion", PCT Application No. PCT/CN2020/077030, Nov. 3, 2020, 6 pages.
20921502.9, "Extended European Search Report", EP Application No. 20921502.9, Oct. 10, 2023, 9 pages.
Ericsson, "Aperiodic CSI-RS triggering and other remaining aspects for MR-DC", 3GPP TSG RAN WG1 #98, R1-1909145, Prague, Czech Republic [retrieved Dec. 8, 2023]. Retrieved from the Internet <https://www.3gpp.org/ftp/tsg_ran/WG1_RL1/TSGR1_98/Docs>, Aug. 2019, 8 pages.
Nokia, et al., "FL summary for A-CSI triggering with different numerology", 3GPP TSG RAN WG1 #100, R1-2001145, e-meeting [retrieved Dec. 8, 2023] Retrieved from the Internet <https://www.3gpp.org/ftp/tsg_ran/WG1_RL1/TSGR1_100_e/Docs>, Mar. 2020, 7 pages.
202080093034.3, "Foreign Office Action", CN Application No. 202080093034.3, Jul. 18, 2024, 12 pages.

\* cited by examiner

METHOD AND APPARATUS FOR WIRELESS COMMUNICATION

TECHNICAL FIELD

Embodiments of the present disclosure generally relate to wireless communication technology, especially to resource configuration and measurement reporting in a wireless communication system.

BACKGROUND

Wireless communication systems are widely deployed to provide various telecommunication services such as telephony, video, data, messaging, broadcasts, and so on. Wireless communication systems may employ multiple access technologies capable of supporting communication with multiple users by sharing available system resources (e.g., time, frequency, and power). Examples of wireless communication systems may include fourth generation (4G) systems such as long term evolution (LTE) systems, LTE-advanced (LTE-A) systems, or LTE-A Pro systems, and fifth generation (5G) systems which may also be referred to as new radio (NR) systems.

To extend the coverage and availability of wireless communication systems (e.g., 5G systems), satellite and high-altitude platforms may be utilized as relay devices in communications related to ground devices such as user equipment (UE). Network or segment of network using radio frequency (RF) resources on board a satellite or an airborne aircraft may be referred to as a non-terrestrial network (NTN). In a NTN, some or all functions of a base station (BS) may be deployed in a satellite or an airborne aircraft.

In wireless communication systems, a BS or a satellite may be associated with multiple beams. Techniques for beam management in these wireless communication systems are desired. Moreover, techniques for measurement reporting (e.g., channel state information (CSI) report) in these wireless communication system are also desired.

SUMMARY

An embodiment of the present disclosure provides a method. The method may include: receiving a signaling indicating configuration information on a set of aperiodic channel state information reference signal (CSI-RS) resources corresponding to a trigger state in a downlink control information (DCI). The set of aperiodic CSI-RS resources may include a plurality of subsets of aperiodic CSI-RS resources; and receiving at least one aperiodic CSI-RS resource of the set of aperiodic CSI-RS resources according to the configuration information.

In an embodiment of the present application, the configuration information may indicate a corresponding bandwidth part (BWP) index for each subset of aperiodic CSI-RS resources. In an embodiment of the present application, the configuration information may indicate time domain offset information for each subset of aperiodic CSI-RS resources. In an embodiment of the present application, the configuration information may indicate a first offset for a first subset of aperiodic CSI-RS resources of the plurality of subsets of aperiodic CSI-RS resources. The first subset of aperiodic CSI-RS resources may be the closest to the DCI on the time domain among the plurality of subsets of aperiodic CSI-RS resources.

In an embodiment of the present application, the method may further include transmitting a CSI report indicating a reference signal received power (RSRP) value for the at least one aperiodic CSI-RS resource and an index of the at least one aperiodic CSI-RS resource.

In an embodiment of the present application, the method may further include switching to a first bandwidth part (BWP) to receive the at least one aperiodic CSI-RS resource triggered by the DCI in a second BWP; and after channel state information measurement for the plurality of subsets of aperiodic CSI-RS resources, switching back to the second BWP for information transmission or reception.

Another embodiment of the present disclosure provides a method. The method may include transmitting a signaling indicating configuration information on a set of aperiodic channel state information reference signal (CSI-RS) resources corresponding to a trigger state in a downlink control information (DCI), wherein the set of aperiodic CSI-RS resources may include a plurality of subsets of aperiodic CSI-RS resources; and transmitting at least one aperiodic CSI-RS resource of the set of aperiodic CSI-RS resources according to the configuration information.

In an embodiment of the present application, the configuration information may indicate a corresponding bandwidth part (BWP) index for each subset of aperiodic CSI-RS resources. In an embodiment of the present application, the configuration information may indicate time domain offset information for each subset of aperiodic CSI-RS resources. In an embodiment of the present application, the configuration information may indicate a first offset for a first subset of aperiodic CSI-RS resources of the plurality of subsets of aperiodic CSI-RS resources, and the first subset of aperiodic CSI-RS resources is closest to the DCI on the time domain among the plurality of subsets of aperiodic CSI-RS resources.

In an embodiment of the present application, the method may further include receiving a CSI report indicating a reference signal received power (RSRP) value for the at least one aperiodic CSI-RS resource and an index of the at least one aperiodic CSI-RS resource.

Another embodiment of the present application provides an apparatus. The apparatus includes: at least one non-transitory computer-readable medium having stored thereon computer-executable instructions; at least one receiving circuitry; at least one transmitting circuitry; and at least one processor coupled to the at least one non-transitory computer-readable medium, the at least one receiving circuitry and the at least one transmitting circuitry. The computer-executable instructions cause the at least one processor to implement any of the above-mentioned methods.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of the preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as 3GPP 5G (NR), 3GPP LTE, and so on. It is contemplated that along with the developments of network architectures and new service scenarios, all embodiments in the present disclosure are also applicable to similar technical problems; and moreover, the terminologies recited in the present disclosure may change, which should not affect the principle of the present disclosure.

Figure 1:
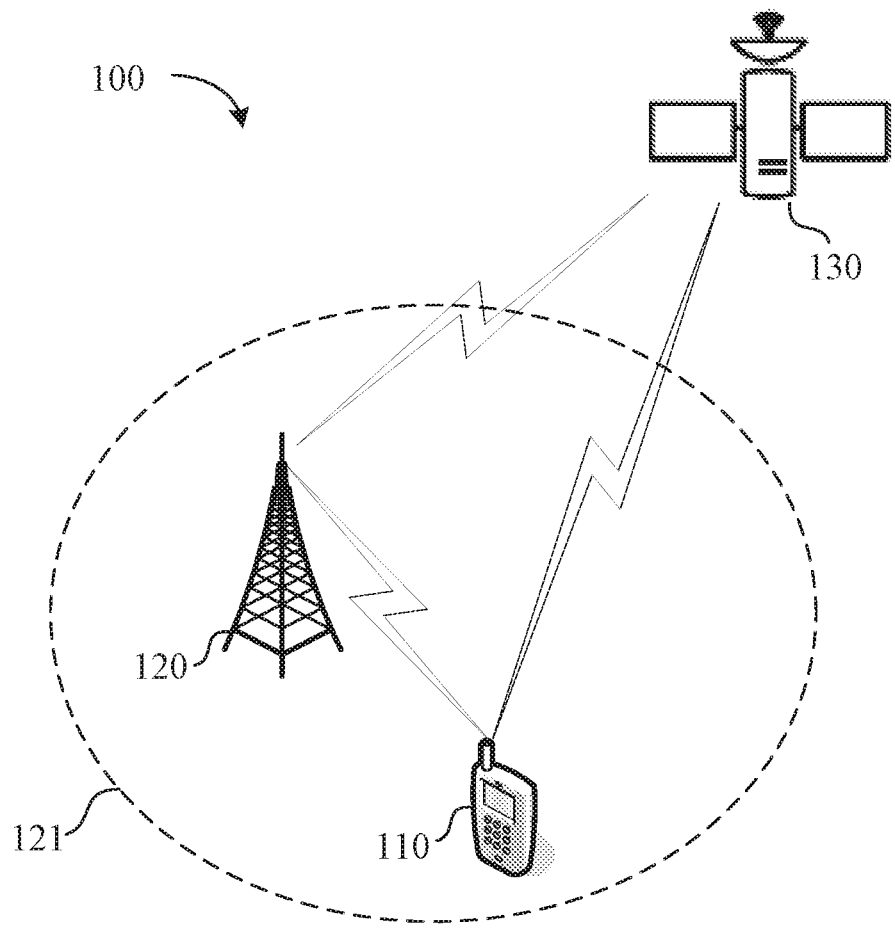
FIG. 1 is a schematic diagram illustrating an exemplary wireless communication system according to some embodiments of the present disclosure.

FIG. 1 is a schematic diagram illustrating an exemplary wireless communication system 100 according to some embodiments of the present disclosure.

Referring to FIG. 1, the wireless communication system 100 may include one or more UEs (e.g., UE 110), one or more BSs (e.g., BS 120), one or more radio access networks (RANs) (e.g., RAN 121), and one or more satellites (e.g., satellite 130). It is contemplated that the wireless communication system 100 may include any number of UEs, BSs, satellites, networks, and/or network components.

A BS 120 may be any type of device configured to wirelessly interface with at least one UE (e.g., UE 110) to facilitate access to one or more communication networks. The BS 120 may operate, for example based on a standard protocol such as long-term evolution (LTE), LTE-advanced (LTE-A), new radio (NR), or other suitable protocol(s). For example, the BS 120 may include an eNB or a gNB. Persons skilled in the art should understand that as the 3rd Generation Partnership Project (3GPP) and communication technology develop, the terminologies recited in the specification may change, which should not affect the principle of the disclosure.

A BS 120 may be part of RAN 121, which may also include other BSs and/or network elements (not shown), such as a base station controller (BSC), a radio network controller (RNC), and relay nodes. The BS 120 may be configured to transmit and/or receive wireless signals within a particular geographic region, which may be referred to as a cell (not shown in FIG. 1). In some cases, the geographic region for a base station may be divided into sectors, each making up a portion of the geographic region. The term "cell" may refer to a portion of the geographic region (e.g., a sector).

A RAN 121 may be in communication with a core network (not shown in FIG. 1). The RAN 121 may employ one of various radio access technologies (RATs), such as evolved universal terrestrial radio access network (E-UTRAN) radio technology or NR radio technology. The core network (CN) may include a plurality of core network components, such as a mobility management entity (MME) (not shown in FIG. 1) or an access and mobility management function (AMF) (not shown in FIG. 1). The CNs may serve as a gateway for the UEs to access a public switched telephone network (PSTN) and/or other networks (not shown in FIG. 1).

A UE 110 may be any type of device configured to operate and/or communicate in a wireless environment. For example, a UE 110 may include a mobile station, a fixed or mobile subscriber unit, a pager, a cellular phone, a personal digital assistant, a smartphone, a laptop, a notebook, a personal computer, a wireless sensor, consumer electronics, a smart watch and the like. Persons skilled in the art should understand that as technology develops and advances, the terminologies described in the present disclosure may change, but should not affect or limit the principles and spirit of the present disclosure.

Some or all functions of a base station may be deployed in satellite 130. In some cases, a satellite 130 may be also referred to as a base station. In FIG. 1, the satellite 130 may be in communication with the BS 120 and the UE 110. In some examples, the BS 120 may utilize the satellite 130 to relay communications to the UE 110. In some examples, the UE 110 may be connected to a core network (not shown in FIG. 1) via the satellite 130. The concept of cell with respect to a BS may similarly apply to a satellite. For example, a satellite may generate beams over a certain service area, which may be referred to as a cell.

A base station (e.g., a satellite) may generate multiple beams. Beam management procedures may therefore be performed to, for example, mitigate interference between the beams. Various referent signals (RSs), for example, channel state information (CSI) RSs (CSI-RSs), may be employed for beam management. Each CSI-RS (or CSI-RS resource) may correspond to a corresponding beam of the multiple beams of a BS. The BS may establish a correspondence between each beam of the multiple beams of the BS and a corresponding CSI-RS resource, and may allocate CSI-RS resource according to the correspondence.

CSI-RS resources may be of different types, for example, periodic, aperiodic, and semi-persistent. Different CSI-RS resources may be triggered in different manners. For example, a UE may be configured with at least one trigger state list (e.g., an aperiodic trigger state list) by a BS via a high layer (e.g., radio resource control (RRC) layer) signaling. Each trigger state in the trigger state list may be configured to correspond to a set of CSI-RS resources. For example, an aperiodic trigger state list may be configured to correspond to a set of aperiodic CSI-RS (A-CSI-RS) resources.

A BS may transmit resource configuration information on CSI-RS resources, which may correspond to beams of the BS, to a UE. Each beam of a BS may be associated with a spatial domain filter. From the perspective of a UE, a downlink beam may be associated with a spatial domain reception filter, and an uplink beam may be associated with a spatial domain transmission filter.

A UE may receive a command (e.g., downlink control information (DCI)) from the BS to activate a trigger state(s). The UE may then receive a set of CSI-RS resources corresponding to the trigger state indicated in the DCI according to the resource configuration information. The UE may perform, for example, channel measurements for the CSI-RS resources, and may transmit a measurement report (e.g., CSI report) based on the CSI-RS resources to the BS. A UE may not be triggered with a CSI report for a non-active downlink BWP. In other words, in order to trigger a CSI report from a UE, the UE may need to receive the corresponding DCI and/or the corresponding CSI-RS on an active BWP.

A CSI may include a channel quality indicator (CQI), preceding matrix indicator (PMI), CSI-RS resource indicator (CRI), synchronization signal (SS)/physical broadcast channel (PBCH) block resource indicator (SSBRI), layer indicator (LI), rank indicator (RI), layer 1 reference signal received power (L1-RSRP) or layer 1 signal to interference plus noise ratio (L1-SINR).

Figure 2:
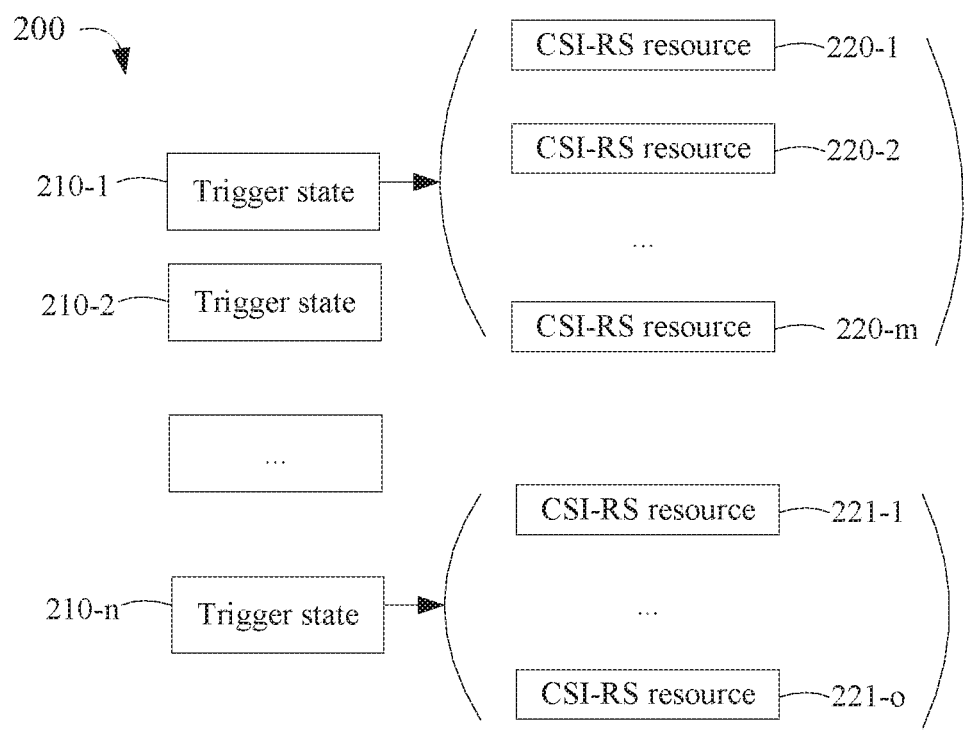
FIG. 2 illustrates a schematic diagram of an exemplary list of trigger states according to some embodiments of the present disclosure.

FIG. 2 illustrates a schematic diagram of an exemplary trigger state list 200 according to some embodiments of the present disclosure.

Referring to FIG. 2, a trigger state list 200 may include one or more trigger states (e.g., trigger state 210-1, trigger state 210-2, . . . and trigger state 210-n. Each trigger state may be configured to correspond to a set of CSI-RS resources. For example, trigger state 210-1 may correspond to a set of CSI-RS resources including at least one CSI-RS resource (e.g., CSI-RS resource 220-1, CSI-RS resource 220-2, . . . and CSI-RS resource 220-m). Trigger state 210-n may correspond to a set of CSI-RS resources including at least one CSI-RS resource (e.g., CSI-RS resource 221-1, . . . and CSI-RS resource 221-o). In some embodiments of the present disclosure, a trigger state list 200 may be an aperiodic trigger state list. It is contemplated that the trigger state list 200 may include any number of trigger states, and a trigger state may correspond to any number of CSI-RS resources.

In some embodiments of the present disclosure, each CSI-RS resource in a set of CSI-RS resources corresponding to a trigger state may correspond to a corresponding beam of a BS. In some embodiments of the present disclosure, each set of CSI-RS resources corresponding to a trigger state may be associated with one bandwidth part (BWP) index. In other words, all CSI-RS resources in such set of CSI-RS resources may be transmitted in the same BWP. In some embodiments of the present disclosure, a set of aperiodic CSI-RS resources corresponding to a trigger state may be configured with a trigger offset. The trigger offset may indicate an offset of the set of aperiodic CSI-RS resources from the DCI, which triggers the aperiodic CSI-RS resources, in the time domain. In other words, a BS may transmit CSI-RS resources in the set of aperiodic CSI-RS resources one by one based on the symbol level time domain resource allocation for the aperiodic CSI-RS resource after a time indicated by the trigger offset from the transmission of the DCI.

From the perspective of a UE, it can only receive and measure resources (e.g., CSI-RS resources) according to limited number (e.g. 1) of beam (e.g., a spatial domain reception filter) based on the UE capability. So a UE may need to perform reception and measurement relating to different beams on different time domain resources. From the perspective of a BS, as the beams generated simultaneously is larger than that generated by UE, it may transmit data to or receive data from (e.g., a physical downlink shared channel (PDSCH) or a physical uplink shared channel (PUSCH)) different UEs using the same time domain resources via different beams.

In order to mitigate interference between multiple beams generated by a base station (e.g., a satellite), different beams may be associated with different frequency domain resources. In some embodiments of the present disclosure, different frequency domain resources allocation may be achieved by employing multiple BWPs or multiple cells. For example, different beams of a base station may be associated with different BWPs. To reduce the latency caused by change of frequency domain resources (e.g., BWPs), some of the multiple beams of a base station or a satellite may be associated with the same BWP. In other words, one or more beams of a base station may be associated with a BWP, and another or some other beams of the base station may be associated with another different BWP.

In addition, to facilitate resource allocation flexibility and avoid confliction between different resources (e.g., between CSI-RS resources and other resources), different beams to a UE may be associated with different time domain resource allocations (e.g., different time domain trigger offsets).

Figure 3:
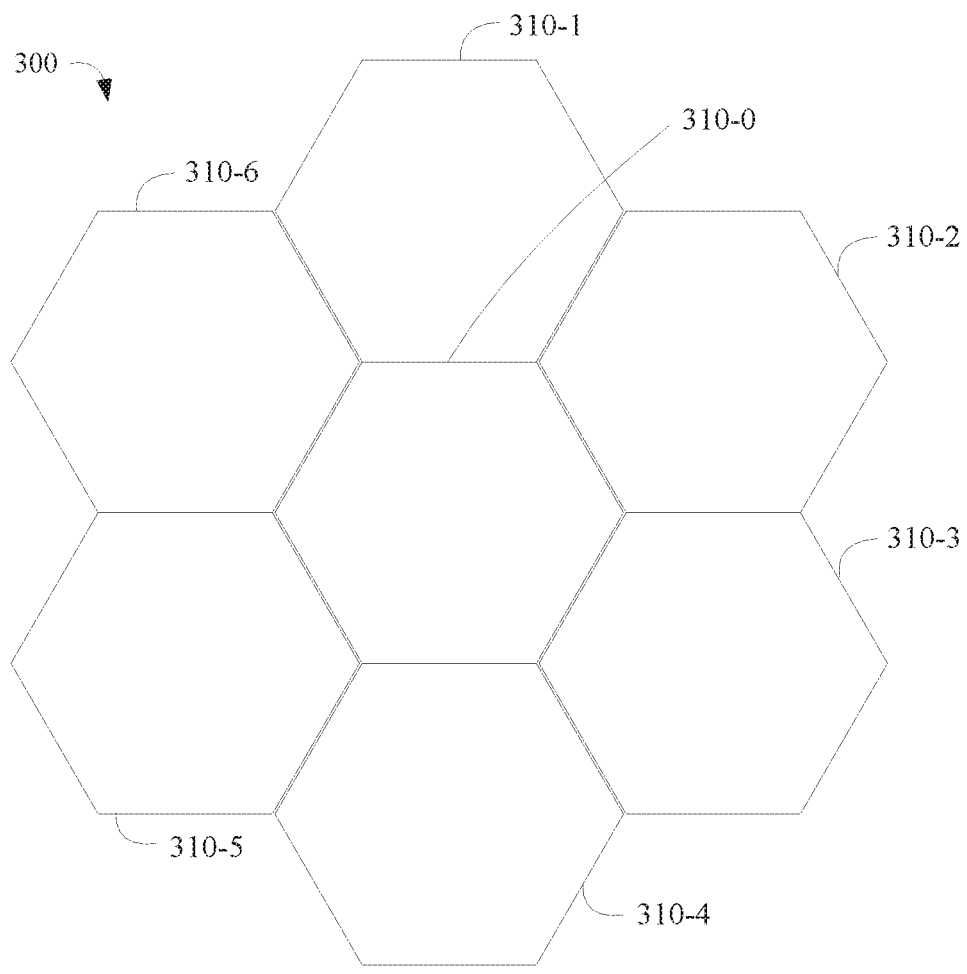
FIG. 3 illustrates a schematic diagram illustrating an exemplary cell according to some embodiments of the present disclosure.

FIG. 3 illustrates a schematic diagram illustrating an exemplary cell 300 of a base station (e.g., a satellite) according to some embodiments of the present disclosure. The base station may perform wireless communication with UEs using multiple beams. In FIG. 3, there are seven beams (e.g., beam 310-0 to beam 310-6) for cell 300. It is contemplated that the cell 300 may include any number of beams.

As mentioned above, it would be beneficial if different beams are associated with different frequency domain resources. For example, as shown in FIG. 3, BWP 320-0, BWP 320-1, and BWP 320-2 may be allocated at different locations in frequency domain. It would be beneficial if different beams of cell 300 are associated with different BWPs. For example, it would be beneficial if beam 310-0 is allocated in BWP 320-2, beam 310-1, beam 310-3, and beam 310-5 are allocated in BWP 320-0, and beam 310-2, beam 310-4, and beam 310-6 are allocated in BWP 320-1. In this case, the CSI-RS resource corresponding to beam 310-0 may be transmitted on BWP 320-2, the CSI-RS resources corresponding to beam 310-1, beam 310-3, and beam 310-5 may be transmitted on BWP 320-0, and the CSI-RS resources corresponding to beam 310-2, beam 310-4, and beam 310-6 may be transmitted on BWP 320-1.

It also would be beneficial if different beams are associated with different time domain resource allocations. For example, the CSI-RS resource corresponding to beam 310-0, the CSI-RS resources corresponding to beam 310-1, beam 310-3, and beam 310-5, and the CSI-RS resources corresponding to beam 310-2, beam 310-4, and beam 310-6 may configured with different trigger offsets.

When beams of a base station are configured to be associated with different BWPs, a UE may need to perform switching between different BWPs to perform measurements such as L1-RSRP measurement. Switching between different BWPs may need to consider BWP switch delay. For example, a BWP may correspond to a sub-carrier space (SCS). Different BWPs may correspond to different SCSs or the same SCS. In some embodiments of the present disclosure, BWP switch delay may be expressed in the number of slots. Table 1 below shows an example of BWP switch delay for different sub-carrier space (SCS) configurations. It should be understood that Table 1 is only for illustrative purposes, and should not be construed as limiting the embodiments of the present disclosure.

TABLE 1

| $\mu$ | Slot length (ms) | BWP switch delay (slots) | |
|---|---|---|---|
| | | Type 1 | Type 2 |
| 0 | 1 | 1 | 3 |
| 1 | 0.5 | 2 | 5 |
| 2 | 0.25 | 3 | 9 |
| 3 | 0.125 | 6 | 18 |

In the above table, $\mu$ may indicate a SCS. For example, "$\mu=0$" may indicate a SCS of 15 kHz (e.g., $SCS_0$), "$\mu=1$" may indicate a SCS of 30 kHz (e.g., $SCS_1$), "$\mu=2$" may indicate a SCS of 60 kHz (e.g., $SCS_2$), and "$\mu=3$" may indicate a SCS of 120 kHz (e.g., $SCS_3$). Type 1 and type 2 may represent different UE capabilities, which may be reported to a BS by a UE.

In some cases, the SCS of a BWP before a BWP switch may be the same as or different from the SCS of another BWP after a BWP switch. For example, according to the above table, if a type 1 UE switches from a BWP corresponding to a SCS (e.g., $SCS_0$) to another BWP corresponding to the same SCS (e.g., $SCS_0$), the BWP switch delay may be expressed as one slot with respect to $SCS_0$.

In some embodiments of the present disclosure, when the SCS of a BWP before a BWP switch is different from the SCS of another BWP after a BWP switch, the BWP switch delay may be determined according to the number of slots corresponding to the larger SCS between the SCS before a BWP switch and the another SCS after a BWP switch. For example, according to the above table, if a type 2 UE switches from a BWP corresponding to $SCS_0$ to a BWP corresponding to $SCS_1$, the BWP switch delay may be 5 slots (i.e., the larger one between 3 slots and 5 slots) with respect to $SCS_1$. If a type 2 UE switches from a BWP corresponding to $SCS_1$ to another BWP corresponding to $SCS_0$, the BWP switch delay may be 5 slots (i.e., the larger one between 3 slots and 5 slots) with respect to $SCS_1$.

To achieve the above-mentioned frequency domain resource allocation where beams of a base station are associated with different BWPs, a trigger state may trigger a measurement report for different beams in different BWPs, and the trigger offset may be configured per BWP. However, according to the configuration shown in FIG. 3, all CSI-RS resources in a set of CSI-RS resources corresponding to a trigger state may be transmitted in the same BWP, and may be configured with the same trigger offset. Therefore, the above-mentioned frequency domain resource allocation cannot be achieved by the configuration in FIG. 3. Moreover, the above-mentioned time domain resource allocation where beams of a base station are associated with different time domain trigger offsets cannot be achieved by the configuration in FIG. 3.

Figure 4:
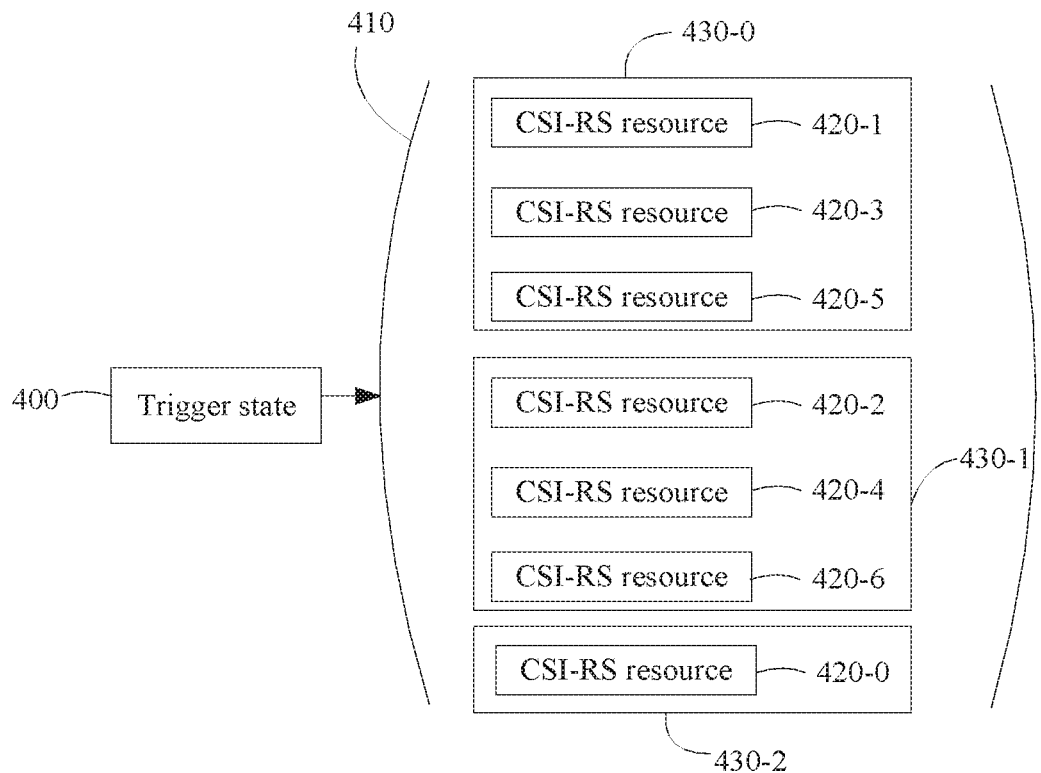
FIG. 4 illustrates a schematic diagram of an exemplary trigger state according to some embodiments of the present disclosure.

FIG. 4 illustrates a schematic diagram of an exemplary trigger state 400 according to some embodiments of the present disclosure. The trigger state 400 may be one of the trigger states in the trigger state list 200 shown in FIG. 2. The configuration shown in FIG. 4 can be applied to achieve the above frequency domain resource allocation or the above time domain resource allocations.

Referring to FIG. 4, a trigger state 400 may be configured to correspond to a set of CSI-RS resources 410 including at least one CSI-RS resource (e.g., CSI-RS resource 420-0, CSI-RS resource 420-1, CSI-RS resource 420-2, CSI-RS resource 420-3, CSI-RS resource 420-4, CSI-RS resource 420-5, and CSI-RS resource 420-6). The set of CSI-RS resources may be divided into at least one subset of CSI-RS resources (e.g., subset of CSI-RS resources 430-0, subset of CSI-RS resources 430-1 and subset of CSI-RS resources 430-2), each of which may include at least one CSI-RS resource. For example, the subset of CSI-RS resources 430-0 may include CSI-RS resource 420-1, CSI-RS resource 420-3 and CSI-RS resource 420-5, the subset of CSI-RS resources 430-1 may include CSI-RS resource 420-2, CSI-RS resource 420-4 and CSI-RS resource 420-6, and the subset of CSI-RS resources 430-2 may include CSI-RS resource 420-0. It is contemplated that a set of CSI-RS resources corresponding to a trigger state may include any number of subsets of CSI-RS resources, each of which may include any number of CSI-RS resources.

Figure 5:
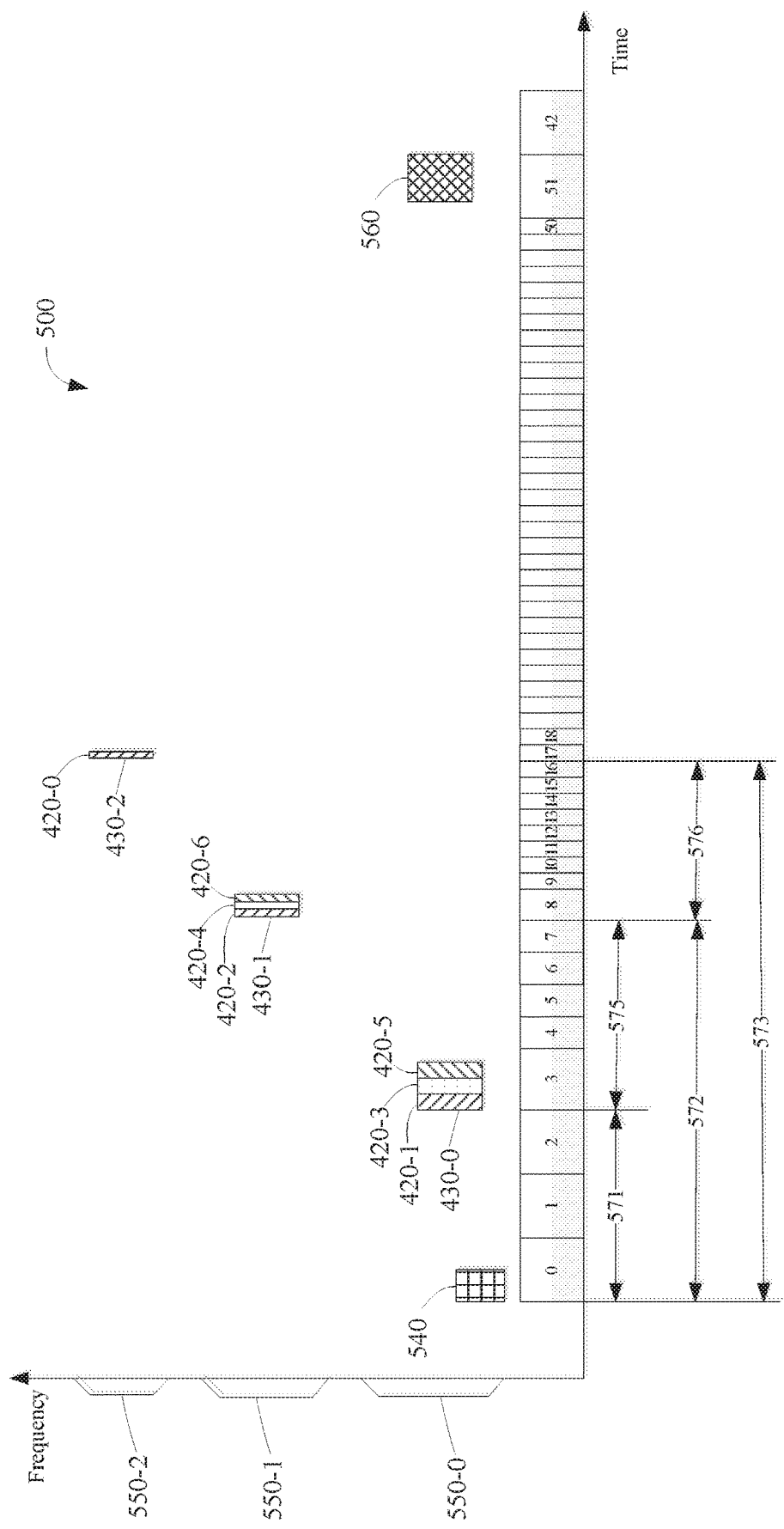
FIG. 5 illustrates exemplary radio resources allocation in accordance with some embodiments of the present disclosure.

The configuration of the set of CSI-RS resources 410 will be described below in combination with FIGS. 3 and 5. FIG. 5 illustrates exemplary radio resources allocation 500 in accordance with some embodiments of the present disclosure. In FIG. 5, a BS may transmit to a UE configuration information on radio resources (e.g., a set of CSI-RS resources 410 corresponding to the trigger state 400 shown in FIG. 4) (not shown in FIG. 5). The UE may then receive from the BS DCI 540, for example, at slot 0, indicating a trigger state (e.g., trigger state 400 in FIG. 4), and may receive from the BS a set of CSI-RS resources (e.g., the set of CSI-RS resources 410) corresponding to the trigger state according to the configuration information as shown FIG. 5.

Referring back to FIG. 4, in some embodiments of the present disclosure, the set of CSI-RS resources 410 may be configured to be associated with one BWP index. In other words, all subsets of CSI-RS resources in the same set of CSI-RS resources may be associated with the same BWP index. In this case, the configuration information on the set of CSI-RS resources 410 may indicate one BWP index.

In some embodiments of the present disclosure, each subset of CSI-RS resources in the set of CSI-RS resources 410 may be configured to be associated with a corresponding BWP index. In these embodiments, the configuration information on the set of CSI-RS resources 410 may indicate a corresponding BWP index for each subset of aperiodic CSI-RS resources.

For example, referring to FIG. 5, BWP 550-0, BWP 550-1, and BWP 550-2 may be allocated at different locations in frequency domain, and may correspond to different SCSs (e.g., a SCS of 15 kHz, a SCS of 30 kHz, and a SCS of 60 kHz, respectively). As shown in FIG. 5, the BS may determine to transmit subset of CSI-RS resource 430-0, subset of CSI-RS resource 430-1, and subset of CSI-RS resource 430-2 in BWP 550-0, BWP 550-1, and BWP 550-2, respectively. In this case, the configuration information on the set of CSI-RS resources 410 may indicate the index of BWP 550-0 (e.g., BWP #0) for subset of CSI-RS resource 430-0, the index of BWP 550-1 (e.g., BWP #1) for subset of CSI-RS resource 430-1, and the index of BWP 550-2 (e.g., BWP #2) for subset of CSI-RS resource 430-2.

BWP 550-0, BWP 550-1, and BWP 550-2 in FIG. 5 may be BWP 320-0, BWP 320-1, and BWP 320-2 in FIG. 3, and CSI-RS resources 420-0 to 420-6 in FIG. 5 may correspond to beams 310-0 to 310-6, respectively. Interference between beams 310-0 to 310-6 may be mitigated based on the above resources configuration.

Referring back to FIG. 4, in some embodiments of the present disclosure, the set of CSI-RS resources 410 may be a set of aperiodic CSI-RS (A-CSI-RS) resources. In some embodiments of the present disclosure, each subset of aperiodic CSI-RS resources (e.g., each of subsets of CSI-RS resources 430-1 to 430-2) of the set of CSI-RS resources 410 may be configured with corresponding time domain offset information. The configuration information on the set of CSI-RS resources 410 may indicate time domain offset information for each subset of aperiodic CSI-RS resources.

In some embodiments of the present disclosure, the time domain offset information of a subset of aperiodic CSI-RS resources may indicate the number of slots between the DCI triggering the set of CSI-RS resources and the subset of aperiodic CSI-RS resources with respect to a SCS. In these embodiments, different subsets of aperiodic CSI-RS resources in the set of aperiodic CSI-RS resources may be associated with the same or different BWP indices.

In some embodiments of the present disclosure, the SCS may be implicitly configured. For example, in some embodiments of the present disclosure, the SCS may be predefined for a frequency range. For instance, referring to FIG. 5, assuming that for a communication system having an operating frequency in the frequency range between 450 MHz to 6000 MHz, the SCS may be predefined as 15 kHz, the time domain offset information for the subset of CSI-RS resources 430-0 may indicate a trigger offset 571 with respect to the predefined SCS of 15 kHz, the time domain offset information for the subset of CSI-RS resources 430-1 may indicate a trigger offset 572 with respect to the predefined SCS of 15 kHz, and the time domain offset information for the subset of CSI-RS resources 430-2 may indicate a trigger offset 573 with respect to the predefined SCS of 15 kHz.

In FIG. 5, the number of slots between the DCI 540 and the subset of CSI-RS resources 430-0 with respect to the SCS of BWP 550-0 (e.g., 15 kHz) is 3 slots, the number of slots between DCI 540 and the subset of CSI-RS resources 430-1 with respect to the SCS of BWP 550-0 (e.g., 15 kHz) is 8 slots, and the number of slots between DCI 540 and the subset of CSI-RS resources 430-2 with respect to the SCS of BWP 550-1 (e.g., 30 kHz) is 17 slots. In this case, the trigger offset 571 may be configured as 3 slots, the trigger offset 572 may be configured as 8 slots, and the trigger offset 573 may be configured as 8.5 slots.

In some embodiments of the present disclosure, the SCS corresponding to the time domain offset information of a subset of aperiodic CSI-RS resources may be based on a SCS of a BWP carrying the subset of aperiodic CSI-RS resources (hereinafter referred to as "a SCS of a BWP after a BWP switch"). In some embodiments of the present disclosure, the SCS corresponding to the time domain offset information of a subset of aperiodic CSI-RS resources may be based on a SCS of a BWP carrying a preceding subset of aperiodic CSI-RS resources of the subset of aperiodic CSI-RS resources or a SCS of a BWP carrying the DCI (hereinafter referred to as "a SCS of a BWP before a BWP switch").

For example, referring to FIG. 5, since the DCI 540 and the subset of CSI-RS resources 430-0 are transmitted in the same BWP (i.e., BWP 550-0), no BWP switch procedure may be performed at a UE when receiving the subset of CSI-RS resources 430-0. However, the SCS of BWP 550-0 may be deemed as a special case of "a SCS of a BWP before a BWP switch" or "a SCS of a BWP after a BWP switch."

In FIG. 5, the number of slots between the DCI 540 and the subset of CSI-RS resources 430-0 with respect to the SCS of BWP 550-0 (e.g., 15 kHz) is 3 slots, the number of slots between DCI 540 and the subset of CSI-RS resources 430-1 with respect to the SCS of BWP 550-0 (e.g., 15 kHz) is 8 slots, and the number of slots between DCI 540 and the subset of CSI-RS resources 430-2 with respect to the SCS of BWP 550-1 (e.g., 30 kHz) is 17 slots.

In some examples, it may be predefined that the SCS corresponding to the time domain offset information of a subset of aperiodic CSI-RS resources may be based on a SCS of a BWP before a BWP switch. In these examples, the time domain offset information for the subset of CSI-RS resources 430-0 may indicate a trigger offset 571 with respect to the SCS of BWP 550-0 (e.g., 15 kHz), the time domain offset information for the subset of CSI-RS resources 430-1 may indicate a trigger offset 572 with respect to the SCS of BWP 550-0 (e.g., 15 kHz), and the time domain offset information for the subset of CSI-RS resources 430-2 may indicate a trigger offset 573 with respect to the SCS of BWP 550-1 (e.g., 30 kHz). The trigger offset 571 may be configured as 3 slots, the trigger offset 572 may be configured as 8 slots, and the trigger offset 573 may be configured as 17 slots.

In some examples, it may be predefined that the SCS corresponding to the time domain offset information of a subset of aperiodic CSI-RS resources may be based on a SCS of a BWP after a BWP switch. In these examples, the time domain offset information for the subset of CSI-RS resources 430-0 may indicate a trigger offset 571 with respect to the SCS of BWP 550-0 (e.g., 15 kHz), the time domain offset information for the subset of CSI-RS resources 430-1 may indicate a trigger offset 572 with respect to the SCS of BWP 550-1 (e.g., 30 kHz), and the time domain offset information for the subset of CSI-RS resources 430-2 may indicate a trigger offset 573 with respect to the SCS of BWP 550-2 (e.g., 60 kHz). The trigger offset 571 may be configured as 3 slots, the trigger offset 572 may be configured as 16 slots, and the trigger offset 573 may be configured as 34 slots.

Referring back to FIG. 4, in some embodiments of the present disclosure, the SCS may be explicitly configured. For example, the SCS may be configured by a radio resource control (RRC) signaling, which may be the same or a different message from the one for configuring the set of CSI-RS resources. For example, a BS may transmit to a UE a RRC signaling indicating both the time domain offset information and the SCS(s) corresponding to the time domain offset information. In some examples, a BS may transmit the time domain offset information to a UE via a RRC signaling, and may transmit the SCS(s) corresponding to the time domain offset information in another RRC signaling. The SCS may be configured per subset of CSI-RS resources or per set of CSI-RS resources.

In some embodiments of the present disclosure, the time domain offset information may be based on BWP switch delay. For example, referring to FIG. 5, a UE (e.g., a type 2 UE) may switch from BWP 550-0 having a SCS of 15 kHz to BWP 550-1 having a SCS of 30 kHz to receive the subset of CSI-RS resources 430-1 from a BS. According to Table 1, the BWP switch delay from BWP 550-0 to BWP 550-1 for a type 2 UE may be 5 slots with respect to 30 kHz. The BS may determine that an offset between a preceding subset (e.g., subset of CSI-RS resources 430-0) of CSI-RS resources 430-1 and the subset of CSI-RS resources 430-1 in the time domain may be greater than, equal to, or slightly less than 5 slots. Assuming that the trigger offset for the subset of CSI-RS resources 430-0 is configured as 3 slots, the trigger offset for the subset of CSI-RS resources 430-1 may be configured as, for example, 8 slots with respect to 30 kHz, taking the 5 slots BWP switch delay into consideration.

Referring back to FIG. 4, in some embodiments of the present disclosure, the configuration information on the set of CSI-RS resources 410 may indicate a offset (hereinafter referred to as "a baseline subset") for a particular subset of aperiodic CSI-RS resources of the set of CSI-RS resources 410. The particular subset of aperiodic CSI-RS resources may be the closest to the DCI triggering the set of CSI-RS resources 410 on the time domain among the at least one subset of aperiodic CSI-RS resources of the set of CSI-RS resources 410. The baseline offset may be the trigger offset for the particular subset of aperiodic CSI-RS resources with respect to a SCS (hereinafter referred to as "a baseline SCS"). In other words, the baseline offset may indicate the number of slots between the DCI and the particular subset of aperiodic CSI-RS resources with respect to a baseline SCS. In these embodiments, different subsets of aperiodic CSI-RS resources in the set of aperiodic CSI-RS resources may be associated with the same or different BWP indices.

In some embodiments of the present disclosure, the baseline SCS may be predefined for a frequency range. In other words, the baseline offset may be based on a SCS predefined for a frequency range. For example, referring to FIG. 5, the particular subset of aperiodic CSI-RS resources may be the subset of CSI-RS resources 430-0. Assuming that for a communication system having an operating frequency in the frequency range between 450 MHz to 6000 MHz, the baseline SCS may be predefined as 30 kHz, the configuration information on the set of CSI-RS resources 410 may indicate a baseline offset with respect to 30 kHz. In FIG. 5, the number of slots between DCI 540 and the subset of CSI-RS resources 430-0 with respect to the SCS of BWP 550-0 (e.g., 15 kHz) is 3 slots. In this case, the baseline offset may be configured as 6 slots.

In some embodiments of the present disclosure, the baseline SCS may be predefined as a SCS of a BWP carrying the DCI triggering the plurality of subsets of aperiodic CSI-RS resources. In other words, the baseline offset may be based on a SCS of a BWP carrying the DCI triggering the plurality of subsets of aperiodic CSI-RS resources. For example, referring to FIG. 5, the SCS of the BWP (e.g., BWP 550-0) carrying DCI 540 is 15 kHz. The configuration information on the set of CSI-RS resources 410 may indicate a baseline offset with respect to 15 kHz. In this case, the baseline offset may be configured as 3 slots.

In some embodiments of the present disclosure, the baseline SCS may be predefined as a SCS of a BWP carrying the particular subset of aperiodic CSI-RS resources. In other words, the baseline offset may be based on a SCS of a BWP carrying the particular subset of aperiodic CSI-RS resources. For example, referring to FIG. 5, the SCS of the BWP (e.g., BWP 550-0) carrying the subset of CSI-RS resources 430-0 is 15 kHz. The configuration information on the set of CSI-RS resources 410 may indicate a baseline offset with respect to 15 kHz. In this case, the baseline offset may be configured as 3 slots.

A UE may determine the trigger offset for each subset of aperiodic CSI-RS resources of a set of CSI-RS resources based on the baseline offset. A BS may perform a similar procedure for determining the trigger offset for each of the subset of aperiodic CSI-RS resources of the set of CSI-RS resources, and may transmit the CSI-RS resources according to the determined trigger offset(s).

For instance, in some embodiments of the present disclosure, the UE may determine a trigger offset for a subset of aperiodic CSI-RS resources by: determining an offset between the subset of aperiodic CSI-RS resources and a preceding subset of aperiodic CSI-RS resources on the time domain, and may determine the trigger offset for the subset of aperiodic CSI-RS resources based on the baseline offset and the determined offset.

For example, referring to FIG. 5, the UE may determine the baseline offset as the trigger offset (e.g., the trigger offset 571) for subset of aperiodic CSI-RS 430-0. The UE may determine an offset (e.g., the offset 575) between subset of aperiodic CSI-RS 430-0 and a subsequent subset of aperiodic CSI-RS (e.g., aperiodic CSI-RS 430-1) of aperiodic CSI-RS 430-0. The UE may determine the trigger offset (e.g., trigger offset 572) for aperiodic CSI-RS 430-1 based on the baseline offset and offset 575. Then, the UE may determine an offset (e.g., offset 576) between subset of aperiodic CSI-RS 430-1 and a subsequent subset of aperiodic CSI-RS (e.g., aperiodic CSI-RS 430-2) of aperiodic CSI-RS 430-0. The UE may determine the trigger offset (e.g., trigger offset 573) for aperiodic CSI-RS 430-2 based on the baseline offset and offset 576.

In some embodiments of the present disclosure, the offset (e.g., offset 575 or offset 576 in FIG. 5) between two adjacent subsets of aperiodic CSI-RS resources on the time domain may be based on a SCS predefined for a frequency range. For instance, referring to FIG. 5, assuming that for a communication system having an operating frequency in the frequency range between 450 MHz to 6000 MHz, the SCS may be predefined as 15 kHz, the UE may determine offset 575 and offset 576 with respect to the predefined SCS of 15 kHz.

In some embodiments of the present disclosure, the offset (e.g., offset 575 or offset 576 in FIG. 5) between two adjacent subsets of aperiodic CSI-RS resources on the time domain may be based on a SCS of a BWP carrying the DCI triggering the set of aperiodic CSI-RS resources. For instance, referring to FIG. 5, the SCS of the BWP (e.g., BWP 550-0) carrying DCI 540 is 15 kHz. The UE may determine offset 575 and offset 576 with respect to 15 kHz.

In some embodiments of the present disclosure, the offset (e.g., the offset 575 or the offset 576 in FIG. 5) between two adjacent subsets of aperiodic CSI-RS resources on the time domain may be based on a SCS of a BWP carrying either of the two adjacent subsets of aperiodic CSI-RS.

In some examples, the offset may be based on a SCS of a BWP carrying the preceding subset of aperiodic CSI-RS resources of two adjacent subsets of aperiodic CSI-RS. For instance, referring to FIG. 5, the SCS of the BWP (e.g., BWP 550-0) carrying the subset of CSI-RS resources 430-0 is 15 kHz, the SCS of the BWP (e.g., BWP 550-1) carrying the subset of CSI-RS resources 430-1 is 30 kHz, and the SCS of the BWP (e.g., BWP 550-2) carrying the subset of CSI-RS resources 430-2 is 60 kHz. The UE may determine the offset 575 with respect to 15 kHz, and may determine the offset 576 with respect to 30 kHz.

In some examples, the offset may be based on a SCS of a BWP carrying the subsequent subset of aperiodic CSI-RS resources of two adjacent subsets of aperiodic CSI-RS. For instance, referring to FIG. 5, the UE may determine an offset 575 with respect to 30 kHz, and may determine the offset 576 with respect to 60 kHz.

In some embodiments of the present disclosure, the offset (e.g., an offset 575 or an offset 576 in FIG. 5) between two adjacent subsets of aperiodic CSI-RS resources on the time domain may be based on a BWP switch delay. The BWP switch delay may be associated with a SCS of a BWP carrying either of the two adjacent subsets of aperiodic CSI-RS. For example, the BWP switch delay may be determined according to the number of slots corresponding to the larger SCS between the SCS(s) of the BWP(s) carrying the two adjacent subsets of aperiodic CSI-RS.

For instance, assuming that it is predefined that the offset between two adjacent subsets of aperiodic CSI-RS resources on the time domain is determined based on a SCS of a BWP carrying the subsequent subset of aperiodic CSI-RS resources of the two adjacent subsets of aperiodic CSI-RS. Referring to FIG. 5, a UE (e.g., a type 2 UE) may determine the offset 575 with respect to the SCS of the BWP (e.g., BWP 550-1) carrying the subset of CSI-RS resources 430-1, and may determine the offset 576 with respect to the SCS of the BWP (e.g., BWP 550-2) carrying the subset of CSI-RS resources 430-2. BWP 550-1 has a SCS of 30 kHz and BWP 550-2 has a SCS of 60 kHz. In this case, the UE may determine the offset 575 with respect to 30 kHz, and may offset 576 with respect to 60 kHz.

According to Table 1, the BWP switch delay from 15 kHz to 30 kHz for a type 2 UE may be 5 slots with respect to 30 kHz (i.e., the larger SCS between 15 kHz and 30 kHz). The UE may determine offset 575 based on the BWP switch delay from 15 kHz to 30 kHz. For example, the UE may determine the offset 575 as 5 slots with respect to 30 kHz. The UE may then determine the trigger offset 572 for the subset of CSI-RS resources 430-1 based on the configured baseline offset and the offset 575. Assuming that the baseline offset is configured to be 3 slot with respect to the SCS of the BWP (e.g., BWP 550-0) carrying DCI 540, the baseline offset is 3 slots with respect to 15 kHz, and the trigger offset 572 may be 8 slots (i.e., 3 slots+5 slots) with respect to 30 kHz.

According to Table 1, the BWP switch delay from 30 kHz to 60 kHz for a type 2 UE may be 9 slots with respect to 60 kHz (i.e., the larger SCS between 30 kHz and 60 kHz). The UE may determine the offset 576 based on the BWP switch delay from 30 kHz and 60 kHz. For example, the UE may determine the offset 576 as 9 slots with respect to 60 kHz. The UE may then determine the trigger offset 573 for the subset of CSI-RS resources 430-2 based on the configured the baseline offset and the offset 576. Assuming that the baseline offset is configured to be 3 slot with respect to the SCS of the BWP (e.g., BWP 550-0) carrying DCI 540, the baseline offset is 3 slots with respect to 15 kHz, and the trigger offset 572 may be 17 slots (i.e., 3 slots+5 slots+9 slots) with respect to 60 kHz.

In some embodiments of the present disclosure, the offset between two adjacent subsets of aperiodic CSI-RS resources on the time domain may be predefined. For example, the predefined offset may be based on a maximum BWP switch delay. According to Table 1, the maximum BWP switch delay for a type 2 UE is 18 slots. A type 2 UE may determine the offset between two adjacent subsets of aperiodic CSI-RS resources on the time domain as 18 slots.

Referring to FIG. 5, after receiving and measuring a set of CSI-RS resources (e.g., the set of CSI-RS resources 410), a UE may transmit a CSI report indicating measurement(s) on at least one CSI-RS resource of the set of CSI-RS resources 410 to a BS. For example, the UE may switch back to the BWP (e.g., BWP 550-0) carrying DCI 540 to transmit the CSI report via, for example, a physical uplink shared channel (PUSCH) resource 560 within slot 51. Alternatively, the UE may switch to an uplink (UL) BWP indicated by the DCI 540 to transmit the CSI report via a physical uplink control channel (PUCCH) or a PUSCH. The CSI report may indicate, for example, a RSRP value (e.g., L1-RSRP value) for the at least one CSI-RS resource, and an index of the at least one CSI-RS resource. The CSI report may also indicate at least one of CQI, PMI, CRI, SSBRI, LI, or RI.

In some embodiments of the present disclosure, the UE may index the CSI-RS resource(s) in the set of CSI-RS resources 410 in the following order: first, in increasing order of CSI-RS resources within a subset of CSI-RS resources; and then, in increasing order of subset indices of the subsets of CSI-RS resources of the set of CSI-RS resources 410.

For example, referring to FIG. 5, assuming that the subset indices of the subset of CSI-RS resources 430-0, subset of CSI-RS resources 430-1 and subset of CSI-RS resources 430-2 may be configured or indexed as "0," "1," and "2," respectively, CSI-RS resource 420-1, CSI-RS resource 420-3 and CSI-RS resource 420-5 in the subset of CSI-RS resources 430-0 may be indexed as "0," "1," and "2," respectively. CSI-RS resource 420-2, CSI-RS resource 420-4 and CSI-RS resource 420-6 in the subset of CSI-RS resources 430-1 may be indexed as "3," "4," and "5," respectively. CSI-RS resource 420-0 in the subset of CSI-RS resources 430-3 may be indexed as "6." To report the RSRP value for CSI-RS resource 420-5, the CSI report may report a CRI (CSI-RS resource indicator) indicating the index "2" with the RSRP value.

In some embodiments of the present disclosure, the UE may index the CSI-RS resource(s) in the set of CSI-RS resources 410 in the following order: for each subset of CSI-RS resources in the set of CSI-RS resources 410, in increasing order of CSI-RS resources within the corresponding subset of CSI-RS resources. In these embodiments, the CSI report may further indicate a subset index of a subset of CSI-RS resources to which the at least one CSI-RS resource belongs.

For example, referring to FIG. 5, assuming that the subset indices of the subset of CSI-RS resources 430-0, subset of CSI-RS resources 430-1 and subset of CSI-RS resources 430-2 may be configured or indexed as "0," "1," and "2," respectively, CSI-RS resource 420-1, CSI-RS resource 420-3 and CSI-RS resource 420-5 in the subset of CSI-RS resources 430-0 may be indexed as "0," "1," and "2," respectively. CSI-RS resource 420-2, CSI-RS resource 420-4 and CSI-RS resource 420-6 in the subset of CSI-RS resources 430-1 may be indexed as "0," "1," and "2," respectively. CSI-RS resource 420-0 in the subset of CSI-RS resources 430-3 may be indexed as "0." To report the RSRP value for CSI-RS resource 420-3, the CSI report may report a CRI indicating the index "1" and the subset index (e.g., "0") of the subset of CSI-RS resources 430-0 with the RSRP value.

In some embodiments of the present disclosure, when each subset of CSI-RS resources in the set of CSI-RS resources 410 is configured to be associated with a corresponding BWP index, the UE may index the CSI-RS resource(s) in the set of CSI-RS resources 410 in the following order: first, in increasing order of CSI-RS resources within a subset of CSI-RS resources; and then, in increasing order of BWP indices of the subsets of CSI-RS resources of the set of CSI-RS resources 410.

For example, referring to FIG. 5, assuming that the BWP indices of BWP 550-0, BWP 550-1, and BWP 550-2 may be configured as "0," "1," and "2," respectively, CSI-RS resource 420-1, CSI-RS resource 420-3 and CSI-RS resource 420-5 in the subset of CSI-RS resources 430-0 may be indexed as "0," "1," and "2," respectively. CSI-RS resource 420-2, CSI-RS resource 420-4 and CSI-RS resource 420-6 in the subset of CSI-RS resources 430-1 may be indexed as "3," "4," and "5," respectively. CSI-RS resource 420-0 in the subset of CSI-RS resources 430-3 may be indexed as "6." To report the RSRP value for CSI-RS resource 420-5, the CSI report may report a CRI (CSI-RS resource indicator) indicating the index "2" with the RSRP value.

In some embodiments of the present disclosure, when each subset of CSI-RS resources in the set of CSI-RS resources 410 is configured to be associated with a corresponding BWP index, the UE may index the CSI-RS resources in the set of CSI-RS resources 410 in the following order: for each subset of CSI-RS resources in the set of CSI-RS resources 410, in increasing order of CSI-RS resources within a corresponding subset of CSI-RS resources. In these embodiments, the CSI report may further indicate a BWP index of a subset of CSI-RS resources to which the at least one CSI-RS resource belongs.

For example, referring to FIG. 5, assuming that the BWP indices of BWP 550-0, BWP 550-1, and BWP 550-2 may be configured as "0," "1," and "2," respectively, CSI-RS resource 420-1, CSI-RS resource 420-3 and CSI-RS resource 420-5 in the subset of CSI-RS resources 430-0 may be indexed as "0," "1," and "2," respectively. CSI-RS resource 420-2, CSI-RS resource 420-4 and CSI-RS resource 420-6 in the subset of CSI-RS resources 430-1 may be indexed as "0," "1," and "2," respectively. CSI-RS resource 420-0 in the subset of CSI-RS resources 430-3 may be indexed as "0." To report the RSRP value for CSI-RS resource 420-3, the CSI report may report a CRI indicating the index "1" and the BWP index (e.g., "0") of the subset of CSI-RS resources 430-0 with the RSRP value.

The BS may perform a similar procedure to index the CSI-RS resources in the set of CSI-RS resources 410, such that the BS would know which CSI-RS resource the index in the CSI report indicates.

In some embodiments of the present disclosure, after receiving and measuring the set of CSI-RS resources 410, a UE may switch back to the BWP (e.g., BWP 550-0) carrying DCI 540 for information transmission or reception. For example, the UE may switch back to BWP 550-0 for monitoring another DCI.

Figure 6:
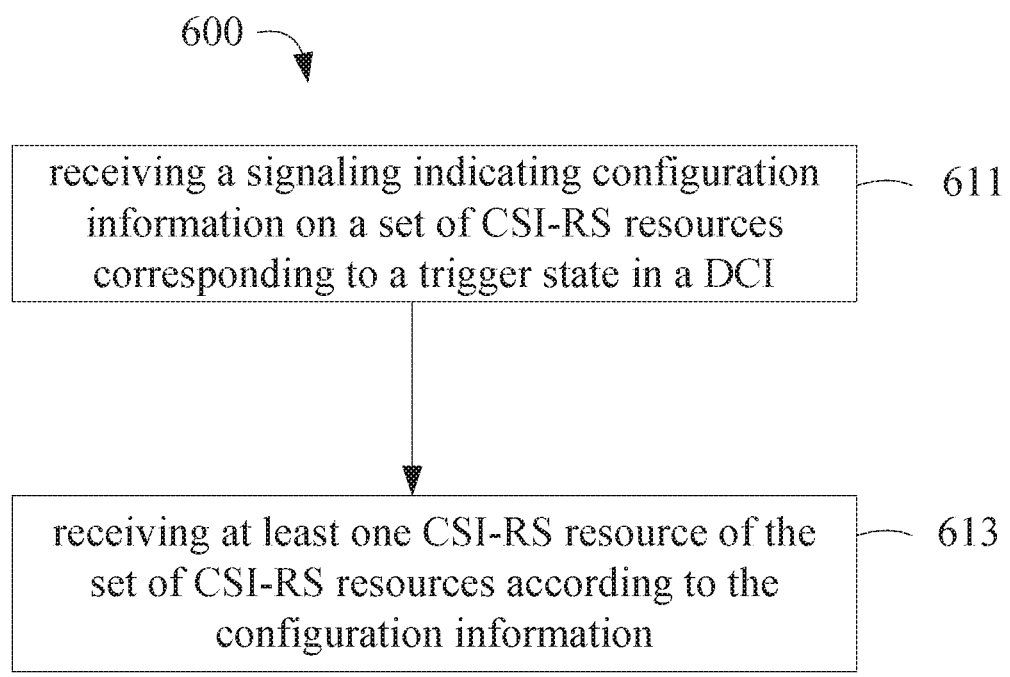
FIG. 6 illustrates a flow chart of an exemplary procedure of wireless communication according to some embodiments of the present disclosure.

FIG. 6 illustrates a flow chart of an exemplary procedure 600 of wireless communication according to some embodiments of the present disclosure. The procedure may be performed by a communication device (e.g., a UE). The communication device may be a UE 110 as shown in FIG. 1.

Referring to FIG. 6, in operation 611, a communication device may receive a signaling indicating configuration information on a set of CSI-RS resources (e.g., aperiodic CSI-RS resources) corresponding to a trigger state in a DCI. The set of CSI-RS resources may include a plurality of subsets of CSI-RS resources. The configuration information on the set of CSI-RS resources may be determined according to one of the methods described above with respect to FIGS. 1-5.

In operation 613, the communication device may receive at least one CSI-RS resource of the set of CSI-RS resources according to the configuration information.

In some embodiments of the present disclosure, the communication device may transmit a CSI report indicating a RSRP value for the at least one CSI-RS resource and an index of the at least one CSI-RS resource. In some embodiments of the present disclosure, the CSI report may further indicate a subset index or a BWP index of a subset of aperiodic CSI-RS resources to which the at least one aperiodic CSI-RS resource belongs. The index of the at least one CSI-RS resource may be determined according to one of the methods described above with respect to FIGS. 1-5.

In some embodiments of the present disclosure, the communication device may switch to a BWP to receive the at least one CSI-RS resource triggered by the DCI in another BWP. The communication device may, after channel state information measurement for the plurality of subsets of CSI-RS resources, switch back to the another BWP for information transmission or reception.

Figure 7:
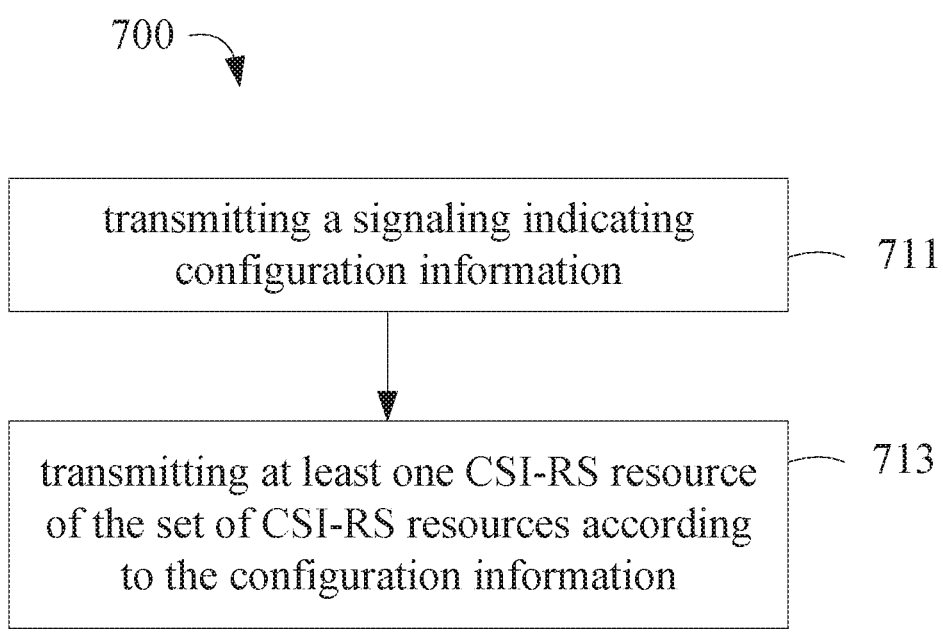
FIG. 7 illustrates a flow chart of an exemplary procedure of wireless communication according to some embodiments of the present disclosure.

FIG. 7 illustrates a flow chart of an exemplary procedure 700 of wireless communication according to some embodiments of the present disclosure. The procedure may be performed by a base station side apparatus (e.g., a BS or a satellite). The base station side apparatus may be BS 120 or satellite 130 as shown in FIG. 1.

Referring to FIG. 7, at the beginning, a base station side apparatus may allocate a set of CSI-RS resources (e.g., aperiodic CSI-RS resources) corresponding to a trigger state in a DCI according to configuration information on the set of CSI-RS resources. The set of CSI-RS resources may include a plurality of subsets of CSI-RS resources. The configuration information may be determined according to one of the methods described above with respect to FIGS. 1-5. The configuration information can achieve the above-mentioned preferred frequency domain resource allocation or preferred time domain resource allocation.

In operation 711, a base station side apparatus may transmit a signaling indicating the configuration information. In operation 713, the base station side apparatus may transmit at least one CSI-RS resource of the set of CSI-RS resources according to the configuration information.

In some embodiments of the present disclosure, the base station side apparatus may receive a CSI report indicating a RSRP value for the at least one CSI-RS resource and an index of the at least one CSI-RS resource. In some embodiments of the present disclosure, the CSI report may further indicate a subset index or a BWP index of a subset of aperiodic CSI-RS resources to which the at least one aperiodic CSI-RS resource belongs. The index of the at least one CSI-RS resource may be determined according to one of the methods described above with respect to FIGS. 1-5.

Figure 8:
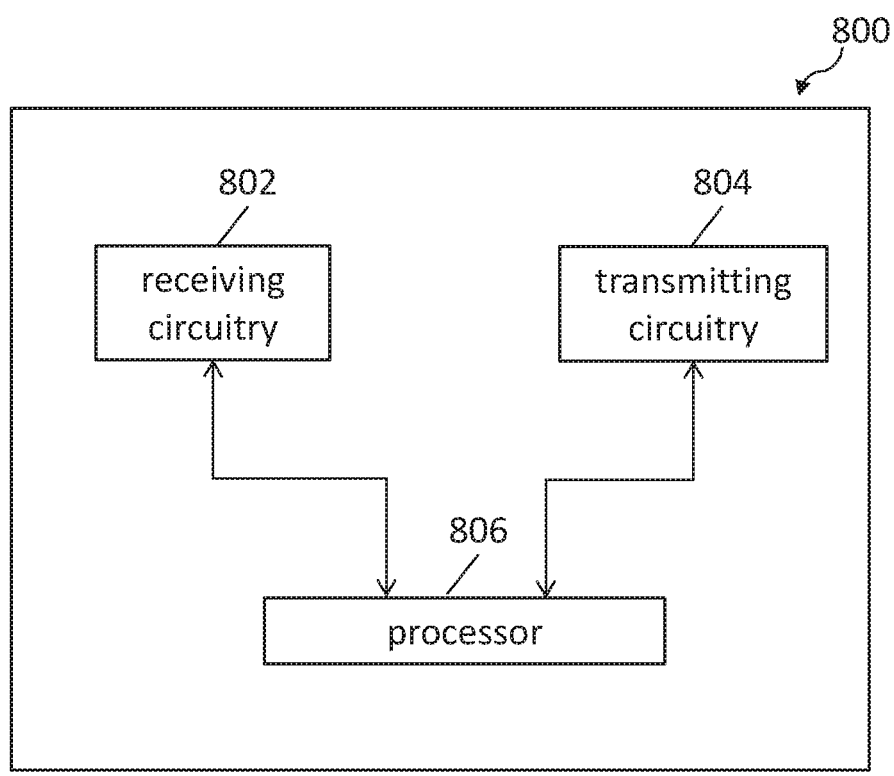
FIG. 8 illustrates a block diagram of an exemplary apparatus in accordance with some embodiments of the present disclosure.

FIG. 8 illustrates an example block diagram of an apparatus 800 according to some embodiments of the present disclosure.

As shown in FIG. 8, the apparatus 800 may include at least one non-transitory computer-readable medium (not illustrated in FIG. 8), at least one receiving circuitry 802, at least one transmitting circuitry 804, and at least one processor 806 coupled to the non-transitory computer-readable medium (not illustrated in FIG. 8), the receiving circuitry 802 and the transmitting circuitry 804. The apparatus 800 may be a base station side apparatus (e.g., a BS or a satellite) or a communication device (e.g., a UE).

Although in this figure, elements such as the at least one processor 806, transmitting circuitry 804, and receiving circuitry 802 are described in the singular, the plural is contemplated unless a limitation to the singular is explicitly stated. In some embodiments of the present disclosure, the receiving circuitry 802 and the transmitting circuitry 804 are combined into a single device, such as a transceiver. In certain embodiments of the present disclosure, the apparatus 800 may further include an input device, a memory, and/or other components.

In some embodiments of the present disclosure, the non-transitory computer-readable medium may have stored thereon computer-executable instructions to cause a processor to implement the method with respect to the UE as described above. For example, the computer-executable instructions, when executed, cause the processor 806 interacting with receiving circuitry 802 and transmitting circuitry 804, so as to perform the steps with respect to the UE depicted in FIGS. 1-6.

In some embodiments of the present disclosure, the non-transitory computer-readable medium may have stored thereon computer-executable instructions to cause a processor to implement the method with respect to the BS or the satellite as described above. For example, the computer-executable instructions, when executed, cause the processor 806 interacting with receiving circuitry 802 and transmitting circuitry 804, so as to perform the steps with respect to the BS or the satellite depicted in FIGS. 1-5 and 7.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes", "including", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a", "an", or the like does not, without more constraints, preclude the existence of additional identical elements in the process, method, article, or apparatus that includes the element. Also, the term "another" is defined as at least a second or more. The term "having" and the like, as used herein, are defined as "including."

What is claimed:

1. A method performed by a user equipment (UE), the method comprising:
receiving a signaling that indicates a set of aperiodic channel state information reference signal (CSI-RS) resources corresponding to a trigger state in a downlink control information (DCI), wherein the set of aperiodic CSI-RS resources comprises a plurality of subsets of aperiodic CSI-RS resources, and wherein respective subsets of aperiodic CSI-RS resources are associated with a time domain offset between the DCI and an aperiodic CSI-RS corresponding to the respective subsets of aperiodic CSI-RS resources; and
receiving at least one aperiodic CSI-RS based at least in part on at least one aperiodic CSI-RS resource of the set of aperiodic CSI-RS resources.

2. The method of claim 1, wherein the signaling indicates a corresponding bandwidth part (BWP) index for the respective subsets of aperiodic CSI-RS resources.

3. A user equipment (UE) for wireless communication, comprising:
at least one memory; and
at least one processor coupled with the at least one memory and configured to cause the UE to:
receive a signaling that indicates a set of aperiodic channel state information reference signal (CSI-RS) resources corresponding to a trigger state in a downlink control information (DCI), wherein the set of aperiodic CSI-RS resources comprises a plurality of subsets of aperiodic CSI-RS resources, and wherein respective subsets of aperiodic CSI-RS resources are associated with a time domain offset between the DCI and an aperiodic CSI-RS corresponding to the respective subsets of aperiodic CSI-RS resources; and
receive at least one aperiodic CSI-RS based at least in part on at least one aperiodic CSI-RS resource of the set of aperiodic CSI-RS resources.

4. The UE of claim 3, wherein the signaling indicates a corresponding bandwidth part (BWP) index for the respective subsets of aperiodic CSI-RS resources.

5. The UE of claim 4, wherein the at least one processor is further configured to cause the UE to transmit a CSI report indicating a reference signal received power (RSRP) value for the at least one aperiodic CSI-RS resource and an index of the at least one aperiodic CSI-RS resource.

6. The UE of claim 5, wherein the at least one processor is further configured to cause the UE to index aperiodic CSI-RS resources in the set of aperiodic CSI-RS resources:
in increasing order of the aperiodic CSI-RS resources within a subset of aperiodic CSI-RS resources; and
in increasing order of BWP indices of the plurality of subsets of aperiodic CSI-RS resources.

7. The UE of claim 5, wherein the at least one processor is further configured to cause the UE to index aperiodic CSI-RS resources in the set of aperiodic CSI-RS resources for the respective subsets of aperiodic CSI-RS resources in increasing order of the aperiodic CSI-RS resources within a corresponding subset of aperiodic CSI-RS resources, wherein the CSI report further indicates a BWP index of a subset of aperiodic CSI-RS resources to which the at least one aperiodic CSI-RS resource belongs.

8. The UE of claim 3, wherein the time domain offset comprises a number of slots between the DCI and the aperiodic CSI-RS corresponding to the respective subsets of aperiodic CSI-RS resources with respect to a sub-carrier space (SCS), and wherein the DCI triggers the plurality of subsets of aperiodic CSI-RS resources.

9. The UE of claim 8, wherein the SCS is configured by a radio resource control (RRC) signaling, or the SCS is based at least in part on an SCS of a bandwidth part (BWP) carrying the respective subsets of aperiodic CSI-RS resources or an SCS of a BWP carrying a preceding subset of aperiodic CSI-RS resources of the subset of aperiodic CSI-RS resources, or the SCS is predefined for a frequency range.

10. The UE of claim 3, wherein the signaling indicates a first offset for a first subset of aperiodic CSI-RS resources of the plurality of subsets of aperiodic CSI-RS resources, and the first subset of aperiodic CSI-RS resources is closest to the DCI in a time domain among the plurality of subsets of aperiodic CSI-RS resources.

11. The UE of claim 10, wherein the first offset is based at least in part on one or more of:
   a sub-carrier space (SCS) of a bandwidth part (BWP) carrying the DCI, wherein the DCI triggers the plurality of subsets of aperiodic CSI-RS resources;
   an SCS of a BWP carrying the first subset of aperiodic CSI-RS resources; or
   an SCS predefined for a frequency range.

12. The UE of claim 10, wherein the at least one processor is further configured to cause the UE to:
   determine a second offset between a second subset of aperiodic CSI-RS resources of the plurality of subsets of aperiodic CSI-RS resources and a third subset of aperiodic CSI-RS resources of the plurality of subsets of aperiodic CSI-RS resources, wherein the third subset of aperiodic CSI-RS resources is subsequent to the second subset of aperiodic CSI-RS resources in the time domain; and
   determine a time domain offset of the third subset of aperiodic CSI-RS resources based at least in part on the first offset and the second offset.

13. The UE of claim 12, wherein the second offset is based at least in part on one or more of:
   a sub-carrier space (SCS) of a bandwidth part (BWP) carrying the DCI, wherein the DCI triggers the plurality of subsets of aperiodic CSI-RS resources;
   an SCS of a BWP carrying the second subset of aperiodic CSI-RS resources;
   an SCS of a BWP carrying the third subset of aperiodic CSI-RS resources; or
   an SCS predefined for a frequency range.

14. The UE of claim 12, wherein the second offset is based at least in part on a BWP switch delay or is predefined.

15. The UE of claim 3, wherein the at least one processor is further configured to cause the UE to transmit a CSI report indicating a reference signal received power (RSRP) value for the at least one aperiodic CSI-RS resource and an index of the at least one aperiodic CSI-RS resource.

16. The UE of claim 15, wherein the at least one processor is further configured to cause the UE to index aperiodic CSI-RS resources in the set of aperiodic CSI-RS resources:
   in increasing order of the aperiodic CSI-RS resources within a subset of aperiodic CSI-RS resources; and
   in increasing order of subset indices of the plurality of subsets of aperiodic CSI-RS resources.

17. The UE of claim 15, wherein the at least one processor is further configured to cause the UE to index aperiodic CSI-RS resources in the set of aperiodic CSI-RS resources for the respective subsets of aperiodic CSI-RS resources in increasing order of the aperiodic CSI-RS resources within a corresponding subset of aperiodic CSI-RS resources, wherein the CSI report further indicates a subset index of a subset of aperiodic CSI-RS resources to which the at least one aperiodic CSI-RS resource belongs.

18. The UE of claim 3, wherein the at least one processor is further configured to cause the UE to:
   switch to a first bandwidth part (BWP) to receive the at least one aperiodic CSI-RS resource triggered by the DCI in a second BWP; and
   after channel state information measurement for the plurality of subsets of aperiodic CSI-RS resources, switch back to the second BWP for information transmission or reception.

19. A network equipment (NE) for wireless communication, comprising:
   at least one memory; and
   at least one processor coupled with the at least one memory and configured to cause the NE to:
      transmit a signaling that indicates a set of aperiodic channel state information reference signal (CSI-RS) resources corresponding to a trigger state in a downlink control information (DCI), wherein the set of aperiodic CSI-RS resources comprises a plurality of subsets of aperiodic CSI-RS resources, and wherein respective subsets of aperiodic CSI-RS resources are associated with a time domain offset between the DCI and an aperiodic CSI-RS corresponding to the respective subsets of aperiodic CSI-RS resources; and
      transmit at least one aperiodic CSI-RS based at least in part on at least one aperiodic CSI-RS resource of the set of aperiodic CSI-RS resources.

20. A processor for wireless communication, comprising:
   at least one controller and coupled with at least one memory and configured to cause the processor to:
      receive a signaling that indicates a set of aperiodic channel state information reference signal (CSI-RS) resources corresponding to a trigger state in a downlink control information (DCI), wherein the set of aperiodic CSI-RS resources comprises a plurality of subsets of aperiodic CSI-RS resources, and wherein respective subsets of aperiodic CSI-RS resources are associated with a time domain offset between the DCI and an aperiodic CSI-RS corresponding to the respective subsets of aperiodic CSI-RS resources; and
      receive at least one aperiodic CSI-RS based at least in part on at least one aperiodic CSI-RS resource of the set of aperiodic CSI-RS resources.

* * * * *